Patented Dec. 8, 1936

2,063,239

UNITED STATES PATENT OFFICE 2,063,239

SYNTHETIC RESIN VARNISH COMPOSITIONS

Charles L. Gabriel, Lawrence, N. Y., assignor, by mesne assignments, to Resinox Corporation, New York, N. Y., a corporation of Delaware No Drawing. Application May 11, 1931, Serial No. 536,691

4 Claims. (Cl. 134—26)

The present invention relates to improvements in synthetic resin compositions. More particularly it relates to resinous compositions of improved properties which are especially valuable in varnishes.

Attempts have been made in the past to prepare varnishes from synthetic resins such as the phenol-aldehyde type by incorporating such resins in suitable solvents. Such solutions are used either for coating surfaces, as of furniture and floors, or for impregnating materials like absorbent paper for the purpose of preparing punch stock. In the latter case a laminated product is prepared from the impregnated paper by curing under pressure at an elevated temperature. The product should be flexible and capable of being cut or having holes punched in it without cracking, checking, or otherwise becoming defective and unsightly. Ordinarily, however, these defects will be encountered and render the article unsuited for many purposes. Difficulties of a similar nature will also be encountered where the resins are used for coatings or for molded articles.

It has now been discovered that by incorporating with synthetic resins of the type above referred to or to solutions of such resins in the usual solvents esters resulting from the reaction of polybasic acids partly with a polyhydric alcohol and partly with a monohydric alcohol and subsequent further condensation, molded products and varnishes of improved properties are obtained, such products not being subject to the same degree of checking, cracking, etc. as is customary with similar resin compositions not containing said esters.

Esters of the type contemplated may be prepared according to the procedure set forth in United States Patent application, Serial No. 515,396 (W. C. Arsem), "Synthetic products and process of making same" filed February 12, 1931. According to the procedure set forth therein, a polyhydric alcohol is first reacted with a polybasic acid or its anhydride. A part, but not all, of the carboxyl groups in the product thus obtained is then esterified in the presence of an esterification catalyst of the usual type, with a monohydric alcohol. The compound thus produced is next further condensed by heating until only a relatively few carboxyl groups remain unreacted. It is believed that the product thus obtained is represented by the following equation:

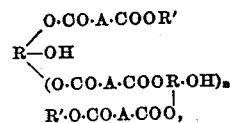

R'·O·CO·A·COO, in which "R" represents the radicle of a polyhydric alcohol, "R'" the radicle of a monohydric alcohol, "A" the radicle of a polybasic acid and "$n$" any number between one and four. By varying the proportion of the reactants and the method of procedure, the average value of "$n$" in the above formula may be changed, resulting, naturally, in a change in the properties of the product. The example given below will illustrate the preparation of an ester of the type represented by the above formula.

Example

One mole (92 grams) of glycerol and 1.5 moles (222 grams) of phthalic anhydride are fused at 130–135° C. Heating is then continued at 160° C. for 10 minutes. During the reaction which takes place at this point apparently one-half of the potential carboxyl groups of the phthalic anhydride are esterified with the glycerol. To the product is next added 300 grams of normal butyl alcohol mixed with 22 grams of concentrated hydrochloric acid (Sp. Gr. 1.2), and the resulting liquid heated as quickly as possible to about 110° C. in a vessel provided with a fractionating column. The material is then distilled at such a rate that the temperature of the liquid being heated rises from 110° C. to 135° C. in about one hour and a half. The unreacted butyl alcohol remaining in the product is then removed by distillating to 125° C. liquid temperature in vacuo. In this step apparently from one-half to two-thirds of the free carboxyl groups remaining after the first step of the operation are esterified with butyl alcohol. The product obtained by the above procedure containing free carboxyl and hydroxyl groups, is next heated at a temperature of 175 to 190° C. for 10 to 30 hours, or until the acid value, as determined in acetone solution, is less than about 12. The final product usually contains appreciable quantities of dibutyl phthalate which may be removed if desired.

The proportions of the reactants in the above example may suitably be varied between 1 and 2 mols of phthalic anhydride per mol. of glycerol and between ¾ and 1½ mols of butyl alcohol per mol. of glycerol, and equivalent amounts of other polybasic acids, polyhydric alcohols, and monohydric alcohols may, of course, be employed.

The compositions obtained as described above range in consistency from very viscous liquids to slightly deformable solids at ordinary room temperature. When heated at a higher temperature they become viscous liquids; they have high molecular weights ranging between 700 and 2000 and are practically non-volatile at temperatures below 200° C., they are miscible with esters, ketones, and aromatic hydrocarbons and alcohols when mixed in equal proportions, and are soluble in all proportions in acetone and in mixtures of alcohols and any of the above mentioned solvents.

In place of phthalic anhydride used in the specific example cited above, such di- and polybasic acids as phthalic acid, terephthalic acid, tartaric acid, malic acid, succinic acid and citric acid may be employed. For the glycerol other di- or polyhydric alcohols such as ethylene glycol, butylene glycol, erythritol, mannitol, etc., may be satisfactorily substituted. Instead of the normal butyl alcohol other aliphatic and aromatic alcohols such as ethanol secondary butyl alcohols, benzyl alcohol, normal amyl alcohol, methyl alcohol, the ethyl ether of ethylene glycol, the mono acetate of diethylene glycol and the like may be used.

Esters of the character hereinabove referred to are compatible with synthetic resins such as phenol-aldehyde, urea-formaldehyde, etc., and in addition are soluble in the usual solvents for said synthetic resins and are consequently particularly well suited for use with said resins in preparing punch stock molded products, varnishes, etc. In preparing a varnish, generally 20–40 parts of an ester of the type described, as for example, the condensation product prepared by reacting glycerol, phthalic anhydride and normal butyl alcohol according to the procedure hereinabove described, to 100 parts by weight of a resin of the heat-hardening type such as phenol-aldehyde resin, may be incorporated in a suitable solvent or solvent mixture of the usual type, as for example, methyl or ethyl alcohols, acetone, methyl ethyl ketone, ethyl acetate, benzol, etc. Generally about 20 parts by weight of a solvent to 80 parts by weight of ester-resin mixture will give a satisfactory varnish of suitable consistency. It is, of course, possible to vary considerably the proportions set forth above without departing from the scope of the present invention. For products of certain character larger proportions of the esters will be desirable while for certain other products smaller proportions will be found to give the best results.

Varnishes of the type hereinabove described may be applied by the usual means, directly to wood, metal, paper, cloth, etc., and are particularly well suited to the production of laminated sheets and similar articles, the sheets thereby obtained being flexible and at the same time tough and resistant to deformation except where excessive quantities of the ester have been employed.

After applying the varnish, the coated material is allowed to dry at ordinary drying temperatures, say approximately 80° C., until the solvents and any moisture present have been evaporated. This temperature and the time of drying may, of course, be varied considerably depending upon the general operating conditions and the character of the product desired. The temperature is next preferably raised for a time to 125–175° C. so as to convert the resin into the infusible and unreactive form. It is customary also in the case of laminated and molded products to subject the article being heated to pressures in the neighborhood of 2,000 pounds per square inch. This, however, may also be varied considerably depending upon the particular conditions under which it is desired to work and the article to be produced.

If desired, the esters hereinabove referred to may be incorporated with the resin without the aid of solvents. The product thus obtained may be subjected to heat and pressure as previously indicated to form molded products and the like.

What is claimed is:

1. A coating composition consisting essentially of a heat-hardening synthetic resin, a viscous liquid to deformable solid condensation product of liquid esters containing free carboxyl groups and resulting from the esterification of a polybasic aromatic acid, partly with a polyhydric alcohol and partly with a monohydric alcohol, and a volatile solvent for said resin and condensation product, in such proportions as to produce a liquid of varnish consistency and capable of forming a homogenous, flexible and tough film.

2. A coating composition consisting essentially of 100 parts of a heat-hardening synthetic resin, 20 to 40 parts of a viscous liquid to deformable solid condensation product of liquid esters containing free carboxyl groups and resulting from the esterification of a polybasic aromatic acid, partly with a polyhydric alcohol and partly with a monohydric alcohol, and a volatile solvent for said resin and condensation product, in such proportion as to produce a liquid of varnish consistency.

3. A coating composition consisting essentially of a heat-hardening synthetic resin, a viscous liquid to deformable solid condensation product of liquid esters containing free carboxyl groups and resulting from the esterification of phthalic acid, partly with glycerol and partly with butyl alcohol, and a volatile solvent for said resin and condensation product, in such proportions as to produce a liquid of varnish consistency and capable of forming a homogenous, flexible and tough film.

4. A coating composition consisting essentially of 100 parts of a heat-hardening synthetic resin, 20 to 40 parts of a viscous liquid to deformable solid condensation product of liquid esters containing free carboxyl groups and resulting from the esterification of phthalic acid, partly with glycerol and partly with butyl alcohol, and a volatile solvent for said resin and condensation product, in such proportion as to produce a liquid of varnish consistency.

CHARLES L. GABRIEL.

Certificate of Correction

Patent No. 2,063,239. December 8, 1936.

CHARLES L. GABRIEL

It is hereby certified that error appears in the printed specification of the above numbered patent requiring correction as follows: Page 2, first column, line 6, for "1½" read *1¼*; and that the said Letters Patent should be read with this correction therein that the same may conform to the record of the case in the Patent Office.

Signed and sealed this 23rd day of February, A. D. 1937.

[SEAL]

HENRY VAN ARSDALE,
*Acting Commissioner of Patents.*